United States Patent [19]

Adkisson et al.

[11] 4,453,848

[45] Jun. 12, 1984

[54] NOISE-REDUCING PLATEN

[75] Inventors: James W. Adkisson, S. Merrit Is.; Paul A. Ishman, Melbourne, both of Fla.

[73] Assignee: Florida Data Corporation, Melbourne, Fla.

[21] Appl. No.: 381,593

[22] Filed: May 24, 1982

[51] Int. Cl.³ .................... B41J 11/053; B41J 19/04
[52] U.S. Cl. .................................. 400/661; 400/659; 400/689
[58] Field of Search ............... 400/552, 648, 659, 660, 400/661, 661.1, 661.2, 661.3, 661.4, 662, 689; 29/110

[56] References Cited

U.S. PATENT DOCUMENTS 1,235,753  8/1917  Anderson ..................... 400/661.3
3,767,023 10/1973  Effinger ....................... 400/552
4,247,213  1/1981  Wurscher ..................... 400/661

FOREIGN PATENT DOCUMENTS 1179573  1/1970  United Kingdom ............ 400/659

OTHER PUBLICATIONS

*The Elements of Physics;* Alpheus Smith; McGraw Hill; 1948; pp. 225–227.
*University Physics;* F. W. Sears & M. W. Zemansky; Addison–Wesley; 1955; pp. 386–390.

Primary Examiner—Edgar S. Burr
Assistant Examiner—David A. Wiecking
Attorney, Agent, or Firm—Howard L. Rose

[57] ABSTRACT

A noise-reducing platen comprising a circular cylinder, a hub disposed along the longitudinal axis of and within the cylinder, and walls for dividing the annular region between the cylinder and the hub into a plurality of separated longitudinal channels extending the length of the cylinder. The walls include a plurality of vanes disposed at angular intervals about the hub, each vane extending (a) from the hub to the inner surface of the cylinder and (b) along the length of the cylinder, each pair of adjacent vanes defining one of the longitudinal channels. It is believed that the vibrations generated along the longitudinal channels are at a frequency above the audible range, thereby resulting in reduced undesired noise when printing elements strike the platen.

9 Claims, 2 Drawing Figures

NOISE-REDUCING PLATEN

FIELD OF THE INVENTION

The present invention relates to a low noise typewriter or printer platen useful in both high speed and low speed typing or printing.

TECHNOLOGICAL CONTEXT OF THE INVENTION

The problem of eliminating noise generated during typing or printing has long been recognized and various solutions to the problem have been sought.

Strongson addresses the problem in U.S. Pat. No. 1,242,071 disclosing a "noiseless" writing machine cylinder which comprises a thick wall of rubber. Following Strongson, Dickey in U.S. Pat. No. 1,668,194 and Thacker in U.S. Pat. No. 1,801,396 suggest the stretching of a rubber layer over a cylinder in a similar attempt to achieve a "noiseless" type of platen.

While Strongson, Dickey and Thacker attempt to resolve the problem of platen noise by changing the material of the platen, Anderson and Schuler have sought to reduce noise by altering the internal structure of the platen cylinder. Specifically, Anderson in U.S. Pat. Nos. 1,235,753 and 1,235,754 proposes filling the hollow interior of a platen cylinder with a plurality of discs stacked longitudinally along the platen interior. The discs, according to Anderson, are theta-shaped, that is each disc represents a circular element having a spoke member provided across its diameter. In stacking the discs along the interior of the platen, Anderson indicates that the spokes on adjacent discs are angularly displaced. Anderson refers to his arrangement as "triple alignment" such that the spokes of every third disc are in alignment. In accordance with Anderson, each disc is flat, is disposed in a plane transverse to the length of the platen, and is insulated from other discs by means of a thin sheet of a soft material (such as paper fiber or some other deadening material) disposed between adjacent discs. The soft material is included to muffle or retard the sound produced when a typewriter element contacts the platen. In addition, the spoke or bridge piece across each disc further reduces the noise by absorbing and retarding the travel of sound within the platen.

Like Anderson, Schuler in U.S. Pat. No. 2,266,275 attempts to decrease the noise made by the platen by damping the sound vibrations in the internal space of a platen cylinder. Specifically, a plurality of zig-zagged ribs are provided along the cylinder interior surface, the ribs serving to enhance the strength and rigidity of the cylinder and thereby decrease the vibrations generated. By zig-zagging the interior surface of the platen cylinder with ribs having sharp edges, the travel of sound waves along the walls of the cylinder and within the cylinder itself is dampened. By adding a rubber layer to the exterior of the hollow platen cylinder, Schuler asserts that his platen "reduces the noise as much as possible"

The patents to both Anderson and Schuler include cap pieces at each end of the platen thereby defining closed chambers in the platen wherein sound may reverberate.

Further, the fabrication of these prior platens, especially the zig-zagged ribs by Schuler and the stacking of discs and sound-absorbing material by Anderson, is costly and relatively complicated.

SUMMARY OF THE INVENTION

In accordance with the present invention, a new approach to quieting the operation of a high speed, or even a low speed typewriter or printing apparatus, is disclosed. Specifically, the present invention, in addition to dampening the noise generated when an element strikes the platen, also provides an internal structure of a platen cylinder wherein the sound generated is at a frequency above the audible frequency range or is otherwise not significantly audible.

The present invention relates to a platen having a circular cylinder that encircles a hub which extends the length of the platen. A plurality of vanes divide the annular region between the cylinder and hub into a plurality of longitudinal channels extending the length of the platen. The longitudinal channels are open-ended and greatly limit the noise generated as typewriter or printer elements strike the outer surface of the platen.

To further reduce noise, a sound absorbing material—such as rubber or a nitrile compound—is provided as an outer coating of the platen.

In accordance with the invention, audible noise is reduced by both causing the frequency of the noise to be above the audible range by means of the longitudinal channels and lessening the impact noise by means of the outer rubber coating. The openended nature of the platen substantially prevents undesired reverberations found in prior technology platens.

In fabricating the platen, a simple die may be used to extrude the hub, vanes, and cylinder as an integral unit. The manufacture of the platen is thus greatly facilitated and the costs therein are greatly decreased compared with prior platens.

Further, one platen after another may be simply fabricated by extruding a metal through the die and cutting the extrudent exitting the die at predetermined times or lengths. The manufacture of platens according to the invention is thus simple and cost efficient relative to the manufacture of previous sound-reducing platend.

Preferably, the vanes represent flat elements extending between the hub and the cylinder along the length of the platen.

DESCRIPTION OF THE INVENTION

Figure 1:
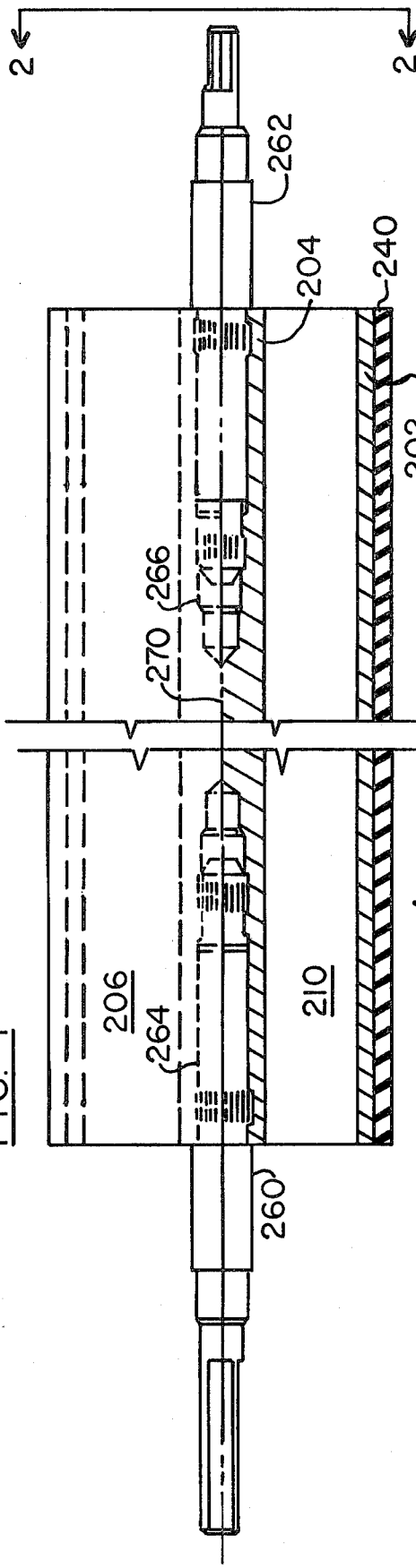
FIG. 1 is a partially cutaway front-view illustration of the platen.
Figure 2:
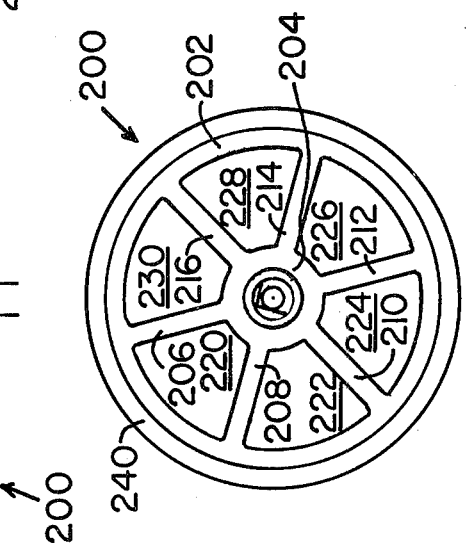
FIG. 2 is a view from the right side of FIG. 1.

Referring to FIGS. 1 and 2, a platen 200 according to the invention is shown. The platen 200 includes a substantially circular hollow cylinder 202 that extends the length of the platen 200 and a hub 204 encircled by and preferably coaxial with the cylinder 202 and extending the length of the platen 200. Disposed between the cylinder 202 and the hub 204 are a plurality of vanes 206 through 216. The vanes 206 through 216 divide the annular region between the hub 204 and cylinder 202 into a plurality of separated, longitudinal channels 220 through 230. Each channel 220 through 230 is open-ended at each end of the platen 200 as seen in FIG. 1, wherein vanes 206 and 210 are illustrated with no end pieces inserted therein.

The vanes 206 through 216, it is readily noted, are spaced at angular intervals about the hub 204 thereby forming longitudinal walls which divide the annular region between the hub 204 and cylinder 202 into the channels 220-230. Preferably, but not necessarily, the angular intervals between the various pairs of adjacent vanes are equal. However, regardless of whether the vanes 206 through 216 are spaced equally, the spacing between adjacent vanes, such as 206 and 208, is small. In particular, the arc covered by each channel 220 through 230 is sufficiently small that sound generated therein is, for the most part, at a frequency above the audible range as defined in the IEEE Dictionary to be 15 to 20,000 Hertz. With the vibratory frequency above the audible range and with reverberation reduced by opening the ends of the platen 200, undesired noise and vibration is reduced compared to other prior platens.

To further increase noise reduction, a resilient material is disposed along the outer periphery of the platen 200 as a cover 240. The cover 240 is preferably a nitrile compound, rubber, or other such material which dampens sound and vibration.

At each end of the hub 204 is a respective shaft element 260 or 262. Each shaft element 260 and 262 extends into an axial recess 264 and 266, respectively, toward each end of the hub 204. The shaft elements 260 and 262 are fixedly coupled to the hub 204 such that rotation of the shaft elements 260 and 262 imparts a rotation to remaining elements of the platen 200 about the longitudinal axis 270 of the cylinder 202.

In fabricating the platen 200, it is noted that the cylinder 202, hub 204 and vanes 206 through 216 can be formed as a single unitary structure by extrusion. In such an embodiment, a metal—such as aluminum—is forced through a die (not shown) wherein the length of the extrudent corresponds to the length of the platen 200. The recesses at each end of the hub 204 can be made by conventional methods. Similarly, the coating 240 can be applied with known techniques.

It will, of course, be realized that various modifications of the platen 200 shown in FIGS. 1 and 2 and substitutions may be made according to the invention. For example, the number and arcuate dimensions of channels are limited primarily only by the frequency of the sound generated. Thus, the platen 200 may have more than six vanes and the vanes, although preferred, need not be equally angularly spaced. Further, although the shaft elements 260 and 262 are shown coupled into recesses of the hub 204, other conventional coupling mechanisms may be employed. It will also be realized that the hub 204 has a "circular" transverse cross-section with vanes extending outward therefrom. The periphery of the hub 204, although preferably circular, need not be. As to modifying the vanes 206 through 216 or the hub 204, nonsymmetry about the axis of the cylinder 202 is to be avoided. Also for this reason, the hub 204 and shaft elements 260 and 262 are coaxial with the cylinder 202. Further, instead of extruding the cylinder 202, hub 204, and vanes 206 through 216 into an integral structure these components may be separated and coupled together by known methods although cost effectiveness will be reduced. Still further, variations in vane structure may be provided. For example, the vanes are not necessarily planar or flat in structure and may assume other shapes wherein channels extending from one open end of the platen to the other are of sufficiently small transverse cross-section to achieve undesired noise reduction.

Various other modifications are also within the scope of the invention which is set forth in the following claims and which is not intended to be limited to the specific construction discussed above.

I claim:

1. In a printer apparatus having a platen and a printing element for striking the platen,
    the platen comprising:
    a hollow circular cylinder;
    a hub disposed at least substantially along the longitudinal axis of and within the cylinder; and
    means for limiting the generation of normally audible noise when the printing element strikes the platen, the noise limiting means comprising:
    wall means for dividing the annular region between the cylinder and the hub into a plurality of separated, longitudinal channels open at each end extending the length of the cylinder; and a rubber layer disposed against and about the outer surface of the cylinder.

2. A platen according to claim 1 wherein the wall means comprises:
    a plurality of vanes disposed at angular intervals about the hub, each vane extending (a) from the hub to the inner surface of the cylinder and (b) along the length of the cylinder,
    each pair of adjacent vanes defining one of the longitudinal channels.

3. A platen according to claim 2 wherein each vane has a planar structure and extends radially outward from the hub.

4. A platen according to claim 3 wherein the adjacent vanes in each pair have the same angular spacing therebetween.

5. A platen according to claim 2 wherein all of the vanes are the same in size and shape.

6. A platen according to claim 4 further comprising:
    shaft means for rotating the circular cylinder, hub, and wall means about the axis of the cylinder, the shaft means (a) being coupled to the hub and (b) having a longitudinal axis colinear with the axis of the cylinder.

7. A platen according to claim 6 wherein the shaft means comprises two shaft elements and wherein the hub has a recess at each end, each recess being dimensioned to accomodate a corresponding one of the shaft elements.

8. A platen according to claim 1 or 7 wherein the hub, and the wall means comprise a single integral unit.

9. A method of reducing the audible noise generated by a printing element striking a platen, the method comprising the step of:
    forming a platen which limits the generation of noise in the normal audible range including the steps of:
    (a) positioning an elongated hub spaced from and along the axis of a hollow circular cylinder;
    (b) positioning vanes at angular intervals about the hub, each vane extending between the hub and the cylinder and each vane extending longitudinally, a channel open at each end being defined between each pair of angularly adjacent vanes; and
    (c) encircling the cylinder with a resilient layer which attenuates vibrations resulting when the platen is struck by the printing element;
    the vane positioning step serving to elevate the frequency of vibration relative to a hollow cylinder platen without vanes, said cylinder encircling step serving to attenuate the vibrations at such elevated frequency.

* * * * *